United States Patent
Matsui et al.

(10) Patent No.: US 7,213,161 B2
(45) Date of Patent: May 1, 2007

(54) SYSTEM FOR CONTROLLING THE CLOCK TO EACH OF A PLURALITY OF PROTOCOL CIRCUITS OF AN INTERFACE CONTROL INTEGRATED CIRCUIT BASED ON THE TYPE OF DATA TO BE TRANSMITTED

(75) Inventors: Takayuki Matsui, Osaka (JP); Ryougo Yanagisawa, Osaka (JP); Kiyotaka Iwamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 478 days.

(21) Appl. No.: 10/692,743

(22) Filed: Oct. 27, 2003

(65) Prior Publication Data

US 2004/0088599 A1    May 6, 2004

(30) Foreign Application Priority Data

Oct. 28, 2002    (JP)   ............................ 2002-312535

(51) Int. Cl.
*G06F 1/00*    (2006.01)
(52) U.S. Cl. ...................................................... 713/322
(58) Field of Classification Search ................ 713/322, 713/320, 323, 600, 500; 710/310; 327/295; 714/700, 814; 370/508, 509
See application file for complete search history.

(56) References Cited

U.S. PATENT DOCUMENTS

| | | | |
|---|---|---|---|
| 6,081,149 A * | 6/2000 | Veendrick ................... | 327/295 |
| 6,125,452 A * | 9/2000 | Kuriyama ................... | 713/600 |
| 6,131,167 A * | 10/2000 | Cruz ........................... | 713/320 |
| 6,604,201 B1 * | 8/2003 | Takahashi et al. .......... | 713/323 |
| 2002/0152346 A1 | 10/2002 | Stone et al. | |
| 2003/0101311 A1 * | 5/2003 | Chang et al. ............... | 710/310 |

FOREIGN PATENT DOCUMENTS

JP    10-301657 A    11/1998

* cited by examiner

*Primary Examiner*—Thomas Lee
*Assistant Examiner*—Sean Weinman
(74) *Attorney, Agent, or Firm*—McDermott Will & Emery LLP

(57) ABSTRACT

In an interface control semiconductor integrated circuit including a plurality of protocol circuits for processing a protocol such as AV- or PC-oriented protocols engaged in an IEEE 1394 standard-compliant data transmission, power consumption is reduced. To achieve this, the interface control semiconductor integrated circuit including the protocol circuits is provided with a plurality of switches associated with the respective protocol circuits and each of the switches performs a switching between supply and shut-off of a clock. A clock is supplied to one of the protocol circuits which should be used whereas clock to unused protocol circuits are shut-off, by controlling each of the switches.

17 Claims, 8 Drawing Sheets

SYSTEM FOR CONTROLLING THE CLOCK TO EACH OF A PLURALITY OF PROTOCOL CIRCUITS OF AN INTERFACE CONTROL INTEGRATED CIRCUIT BASED ON THE TYPE OF DATA TO BE TRANSMITTED

BACKGROUND OF THE INVENTION

The present invention relates to data transmission systems, and in particular, to a power management technique suitable for a protocol circuit in a data transmission system provided with an IEEE 1394 interface.

Digital AV equipment such as digital televisions (DTV), digital video camera (DVC) and set-top box (STB) is now becoming widespread. As a method for data transmission among the digital AV equipment, an IEEE 1394 standard-compliant serial data transmission is mainly adopted.

On the other hand, a large number of PC peripheral equipment such as CD-ROM drives and DVD drives with IEEE 1394 interfaces are coming along. However, the PC peripheral equipment and the digital AV equipment use different protocols. Therefore, even if the PC peripheral equipment and the digital AV equipment are provided with the same type of IEEE 1394 terminals, data cannot be exchanged directly between them.

Protocols engaged in IEEE 1394 standard-compliant serial data transmission are broadly divided into an AV-oriented type and a PC-oriented type. The AV-oriented protocol (hereinafter, referred to as "AV protocol") uses an IEEE 1394-compliant isochronous transmission, notably IEC61883 standard. On the other hand, the PC-oriented protocol (hereinafter, referred to as "PC protocol") uses an IEEE 1394 standard-compliant asynchronous transmission, notably Serial Bus Protocol (SBP)-2 standard.

Conventionally, interface control semiconductor integrated circuits for controlling IEEE 1394 interfaces (hereinafter, referred to as "1394LSIs") are divided into two types, one is provided with AV protocol circuits and the other is provided with PC protocol circuits. Therefore, in the case of data transmission to both of the AV and PC protocols, it is necessary to use two types of 1394LSIs, i.e., an AV-oriented type and a PC-oriented type. However, recently, there has been an increasing demand for using these two protocols especially in digital AV equipment, and thus a 1394LSI with protocol circuits of both of the AV- and PC-oriented types has been developed.

FIG. 9 shows a configuration of the 1394LSI with the protocol circuits of both of the AV- and PC-oriented types. A 1394LSI 100 includes: a PHY 11 for performing initialization and arbitration of a repeater and an IEEE 1394 bus; a LINK control section 12 for exchanging data with the PHY 11; and a plurality of protocol circuits 13a, 13b and 13c. The protocol circuit 13a is an ISO control section for controlling an isochronous transmission to process AV-oriented data such as MPEG2 data and audio data. The protocol circuit 13b is an authentication control section for performing encryption based on a digital transmission content protection (DTCP) standard on an isochronous packet. The protocol circuit 13c is an SBP-2 control section for controlling an asynchronous transmission and processing PC-oriented data. With the debut of such a 1394LSI with a plurality of protocol circuits, a product cost is reduced due to the reduced number of LSIs, a system configuration is simplified, the time required for the development is reduced, for example, in a data transmission system for an IEEE 1394 standard-compliant transmission of AV- and PC-oriented data.

The plurality of protocol circuits incorporated in the 1394LSI described above are not used at the same time. Nevertheless, clocks are always supplied also to unused protocol circuits, resulting in unnecessary power consumption.

Such 1394LSIs as described above are currently incorporated in stationary digital equipment such as DTV or DVD drives in most cases. Since the stationary digital equipment can be supplied with power from commercial power sources, it is unnecessary to consider power consumption by unused protocol circuits in the stationary digital equipment. However, mobile equipment using, as a recording medium, a device such as a DVD or a HDD handling PC-oriented data is expected to come along in future. The mobile equipment is driven mainly by a battery, and thus power consumption will be a particularly important factor. The power consumption by unused protocol circuits should be avoided especially in 1394LSIs incorporated in such mobile equipment.

SUMMARY OF THE INVENTION

It is therefore an object of the present invention to reduce power consumption of a 1394LSI with a plurality of protocol circuits.

In order to solve the problem described above, in an aspect of the present invention, provided is a data transmission system for carrying out a serial data transmission based on IEEE 1394 standard. The data transmission system includes: an interface control semiconductor integrated circuit for controlling the serial data transmission, the interface control semiconductor integrated circuit including a plurality of protocol circuits and a plurality of switches associated with the respective protocol circuits, each of the switches performing a switching between supply and shut-off of a clock; and determination means for obtaining 1394-control-information from the interface control semiconductor integrated circuit and making a determination whether to supply or shut off a clock with respect to each of the protocol circuits based on the 1394-control-information, wherein each of the switches performs the switching based on the determination of the determination means.

According to this aspect of the present invention, the determination means makes a determination whether to supply or shut off a clock with respect to each of the plurality of protocol circuits. This determination is based on the 1394 information obtained from the interface control semiconductor integrated circuit. The 1394-control-information includes various information items used in IEEE 1394 standard and held by registers in the interface control semiconductor integrated circuit, and an IEEE 1394 packet to be transmitted between data transmitting systems, in particular, information included in the header of the packet. By referring to such 1394-control-information, it is possible to know which protocol circuit should be used. Each of the switches of the interface control semiconductor integrated circuit performs a switching between supply and shut-off of a clock, based on the determination of the determination means. That is to say, a clock is supplied only to one of the protocol circuits which is to be used, whereas clocks to the other unused protocol circuits are shut-off. As a result, power consumption of the interface control semiconductor integrated circuit can be reduced.

The interface control semiconductor integrated circuit preferably includes: a clock control register for holding control information on the switches; and a clock selector for controlling operation of the switches based on the control information, and the determination means updates the control information held in the clock control register, based on the determination.

Specifically, the 1394-control-information may be the number of nodes on an IEEE 1394 bus, and the determination means may make the determination based on the number of nodes. Alternatively, the 1394-control-information may be a packet transmitted on an IEEE 1394 bus, and the determination means may analyze the packet and make the determination based on a result of the analysis.

The determination means preferably makes a determination to supply a clock to one of the protocol circuits engaged in the data transmission, after a first packet has been sent or received in a transaction in which the data transmission is requested to begin, at the earliest. In this case, the determination means preferably makes the determination to supply a clock, after a last packet has been sent or received in the transaction. Then, the time required for supplying a clock to the protocol circuit is further reduced.

The determination means preferably makes a determination to shut off a clock with respect to one of the protocol circuits engaged in the data transmission, before a last packet is sent or received in a transaction in which the data transmission is requested to end, at the latest. In this case, the determination means preferably makes the determination to shut off a clock, before a first packet is sent or received in the transaction. Then, the time required for supplying a clock to the protocol circuit is further reduced.

In order to solve the problem described above, in another aspect of the present invention, provided is an interface control semiconductor integrated circuit including a plurality of protocol circuits engaged in a serial data transmission based on IEEE 1394 standard. The interface control semiconductor integrated circuit includes a plurality of switches associated with the respective protocol circuits, and each of the switches performs a switching between supply and shut-off of a clock.

According to this aspect of the present invention, each of the switches performs a clock to be supplied or shut off individually to the associated protocol circuit. Accordingly, it is possible to perform a control such that a clock is supplied to a protocol circuit to be used whereas clocks to unused protocol circuits are shut off. As a result, power consumption of the interface control semiconductor integrated circuit, i.e., a 1394LSI, can be reduced.

The interface control semiconductor integrated circuit preferably includes: a clock control register for holding control information on the switches; and a clock selector for controlling operation of the switches based on the control information.

The interface control semiconductor integrated circuit preferably includes determination means for making a determination whether to supply or shut off a clock with respect to each of the protocol circuits based on 1394-control-information, wherein each of the switches performs the switching based on the determination of the determination means.

In order to solve the problem described above, in another aspect of the present invention, provided is a protocol circuit controlling method for controlling protocol circuits in an interface control semiconductor integrated circuit for controlling a serial data transmission based on IEEE 1394 standard. The method includes: a determination step of making a determination whether to operate each of the protocol circuits or not, based on 1394-control-information obtained from the interface control semiconductor integrated circuit; and a control step of controlling a switching between operation and non-operation of each of the protocol circuits based on the determination in the determination step.

According to this aspect of the present invention, in the determination step, it is determined whether each of the plurality of protocol circuits is to be operated or not. This determination is based on the 1394-control-information obtained from the interface control semiconductor integrated circuit. By referring to the 1394-control-information, it is possible to determine which protocol circuit should be operated. In the control step, a switching between operation and non-operation of each of the protocol circuits is controlled based on a result of the determination in the determination step. That is to say, by operating only one of the protocol circuits which should be used, while not operating the other unused protocol circuits, power consumption of the interface control semiconductor integrated circuit can be reduced.

Specifically, the 1394-control-information may be the number of nodes on an IEEE 1394 bus, and in the determination step, the determination may be made based on the number of nodes. Alternatively, the 1394-control-information may be a packet transmitted on an IEEE 1394 bus, and in the determination step, the packet may be analyzed so that the determination is made based on a result of the analysis.

In the determination step, a determination to operate each of the protocol circuits is preferably made, after a first packet has been sent or received in a transaction in which the data transmission is requested to begin, at the earliest. In this case, in the determination step, the determination to operate each of the protocol circuits is preferably made, after a last packet has been sent or received in the transaction. Then the operation time of the protocol circuits can be further shortened.

In the determination step, a determination not to operate each of the protocol circuits is preferably made, before a last packet is sent or received in a transaction in which the data transmission is requested to end, at the latest. In this case, in the determination step, the determination not to operate each of the protocol circuits is preferably made, before a first packet is sent or received in the transaction. Then the operation time of the protocol circuits can be further shortened.

DESCRIPTION OF THE PREFERRED EMBODIMENTS

Hereinafter, embodiments of the present invention will be described with reference to the drawings.

Embodiment 1

Figure 1:
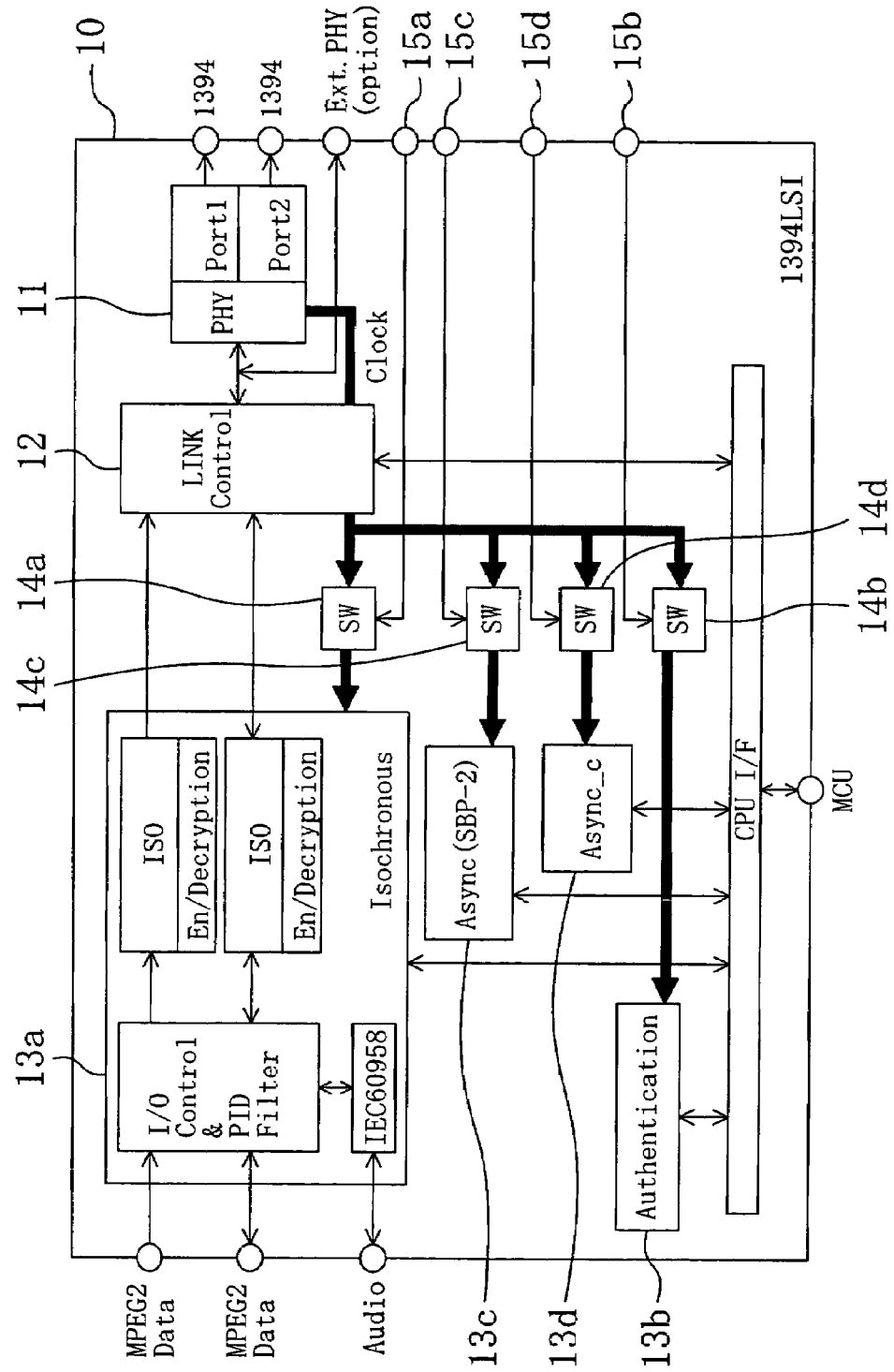
FIG. 1 is a diagram showing a configuration of a 1394LSI according to a first embodiment of the present invention.
Figure 9:
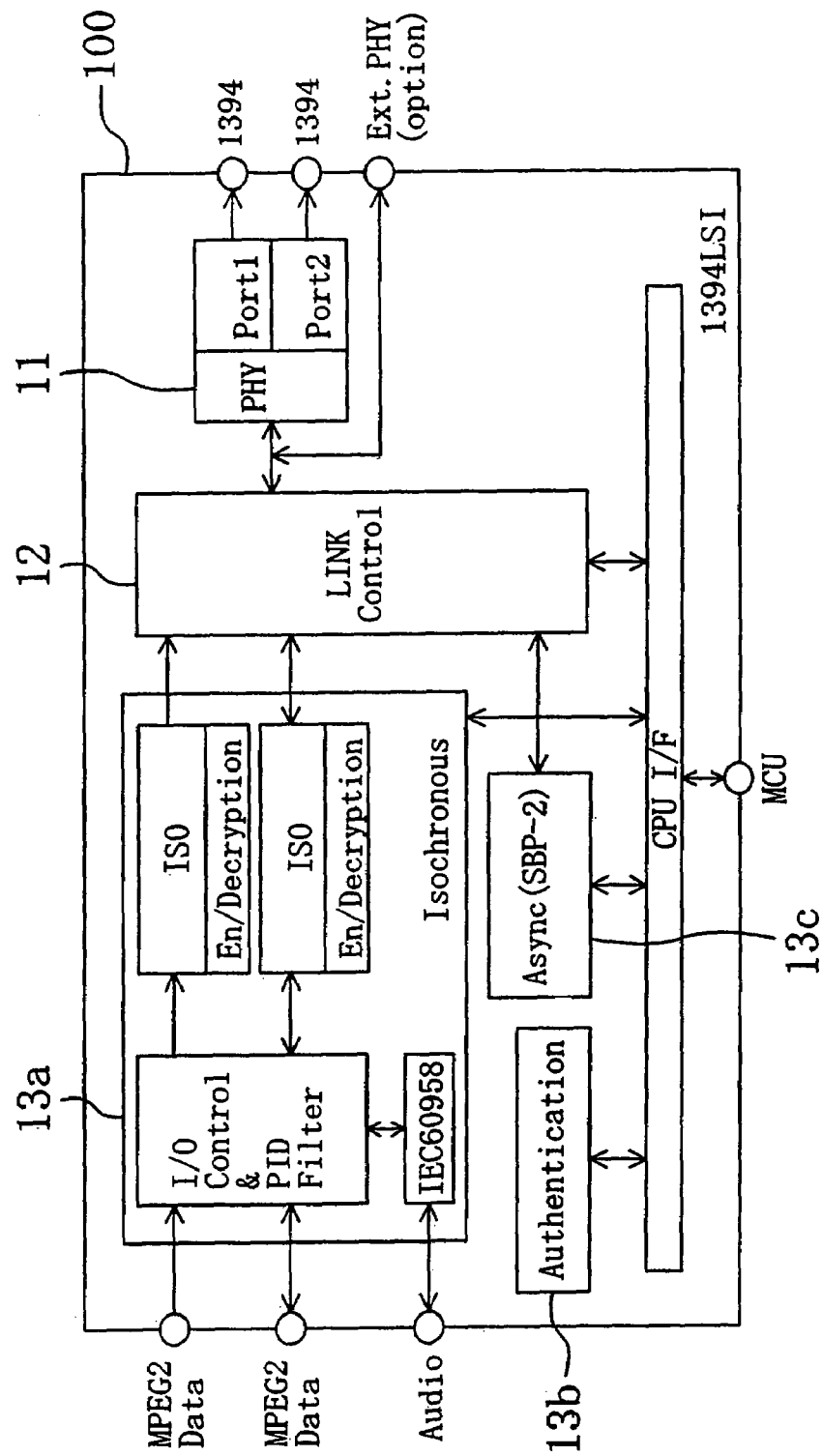
FIG. 9 is a diagram showing a configuration of a known 1394LSI with protocol circuits of both AV- and PC-oriented types.

FIG. 1 shows a configuration of a 1394LSI according to a first embodiment of the present invention. Components which are the same as those described with reference to FIG. 9 are identified by the same reference numerals as in FIG. 9 and description thereof is herein omitted.

A 1394LSI 10 includes: a PHY 11; a LINK control section 12; an ISO control section 13a; an authentication control section 13b; an SBP-2 control section 13c; and an Async_c control section 13d for controlling an asynchronous connection. The ISO control section 13a, authentication control section 13b, SBP-2 control section 13c, and Async_c control section 13d serve as protocol circuits. The 1394LSI 10 also includes switches 14a, 14b, 14c and 14d associated with the protocol circuits 13a through 13d, respectively. The switches 14a through 14d are controllable with signals applied to terminals 15a, 15b, 15c and 15d, respectively.

Now, it will be described how the 1394LSI 10 with the configuration described above operates.

The switches 14a through 14d switch between opening and closure in accordance with the signals applied to the terminals 15a through 15d, respectively. When each of the switches 14a through 14d is closed, a clock received from the PHY 11 via the LINK control section 12 is supplied to each of the respective protocol circuits 13a through 13d. On the other hand, when each of the switches 14a through 14d is opened, the clock is shut off.

For example, suppose that the 1394LSI 10 is transferring MPEG2 data in the current state. In this state, if signals are applied to the terminals 15a through 15d so as to close the switch 14a and open the switches 14b through 14d, a clock is supplied only to the ISO control section 13a necessary for processing on the MPEG2 data and clocks to the other unused protocol circuits 13b through 13d are shut off. Accordingly, power consumption by the unused protocol circuits 13b through 13d is suppressed, thus reducing power consumption. In the processing on MPEG2 data, the MPEG2 data might need to be processed by the authentication control section 13b. In such a case, it is sufficient to apply a given signal to the terminal 15b to close the switch 14b.

As described above, in this embodiment, the 1394LSI 10 with the plurality of protocol circuits 13a through 13d allows the switches 14a through 14b to individually supply/shut off clocks to the protocol circuits 13a through 13d. Accordingly, if the switches 14a through 14b are controlled so as to supply a clock only to one of the protocol circuits 13a through 13d which should be used, the power consumption of the 1394LSI 10 can be reduced to about 60%.

Embodiment 2

Figure 2:
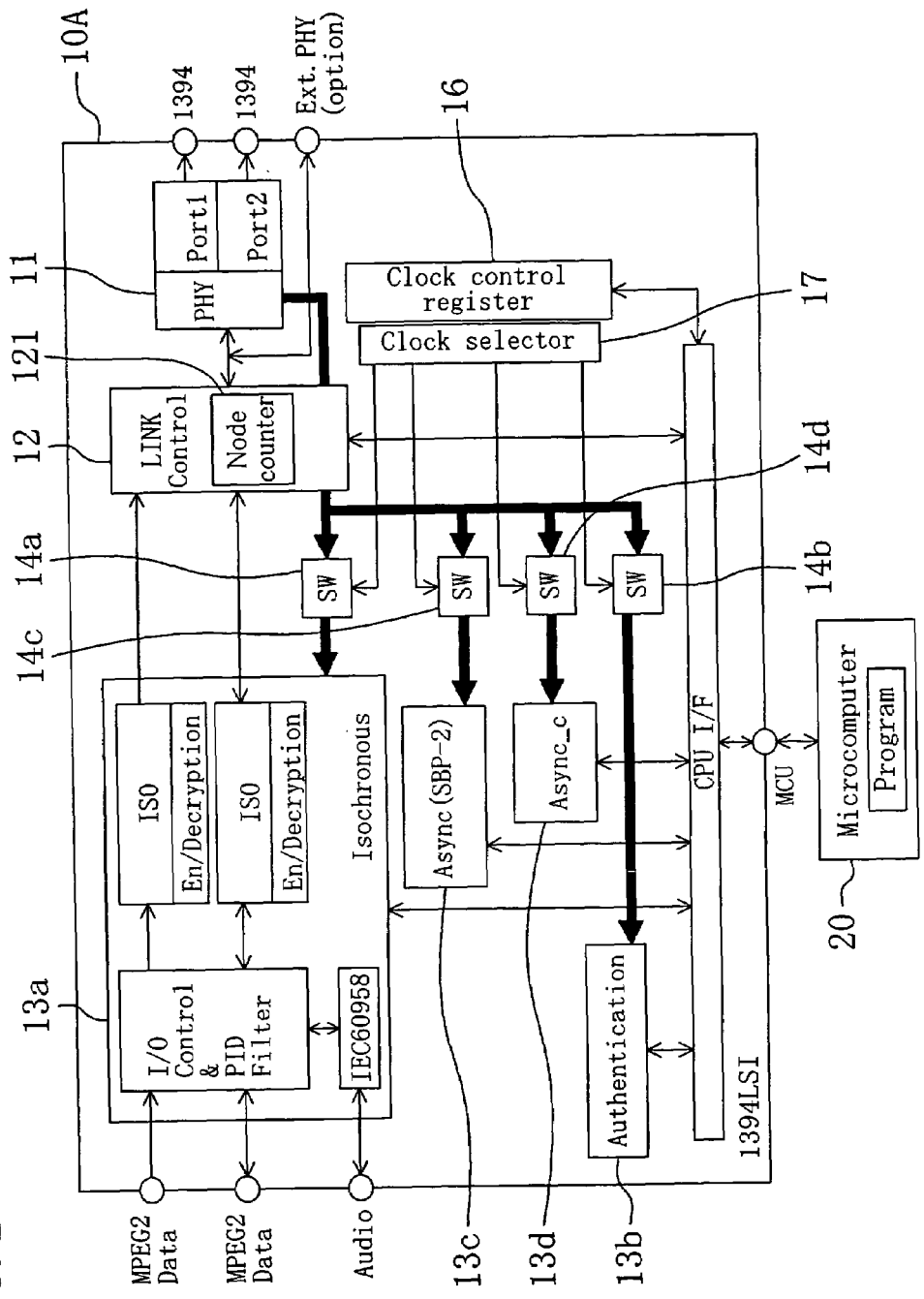
FIG. 2 is a diagram showing a configuration of a data transmission system according to a second embodiment of the present invention.

FIG. 2 shows a configuration of a data transmission system according to a second embodiment of the present invention. Components which are the same as those described in the first embodiment are identified by the same reference numerals as in FIG. 1 and description thereof is herein omitted.

The data transmission system of this embodiment includes: a 1394LSI 10A; and a microcomputer 20. The 1394LSI 10A does not include the terminals 15a, 15b, 15c and 15d in the 1394LSI 10 of the first embodiment but includes a clock control register 16 and a clock selector 17.

The clock control register 16 holds control information on switches 14a through 14d. The clock selector 17 controls operation of the switches 14a through 14d based on the control information held by the clock control register 16.

Figure 3:
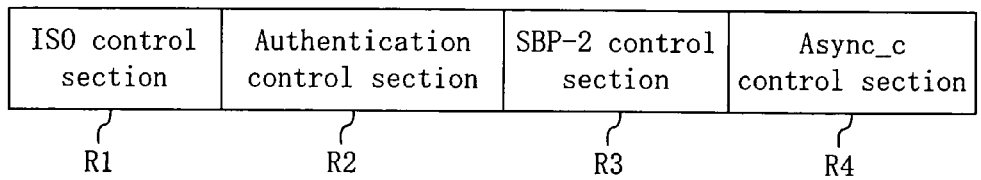
FIG. 3 is a diagram showing the content of a clock control register.

FIG. 3 shows the content of the clock control register 16. The clock control register 16 includes registers R1 through R4 associated with the protocol circuits 13a through 13d included in the 1394LSI 10A. The values of the registers R1 through R4 are rewritable by the microcomputer 20.

The clock selector 17 refers to the values of the registers R1 through R4 of the clock control register 16. When the value of one of the registers is "1", the clock selector 17 controls a switch 14 (reference numeral 14 means any one of 14a through 14d; the same hereinafter) such that a clock is supplied to a protocol circuit 13 (reference numeral 13 means any one of 13a through 13d; the same hereinafter) associated with this register. On the other hand, when the value of one of the registers is "0", the switch 14 is controlled such that a clock to the protocol circuit 13 associated to this register is shut off. In the initial state, all the register values are set at "0" and all the protocol circuits 13a through 13d are in a state in which clocks supplied thereto are shut off.

The microcomputer 20 corresponds to a determination means. The microcomputer 20 is installed with a program which obtains 1394-control-information from the 1394LSI 10A and makes a determination whether to supply or shut off a clock with respect to the protocol circuits 13a through 13d.

Figure 4:
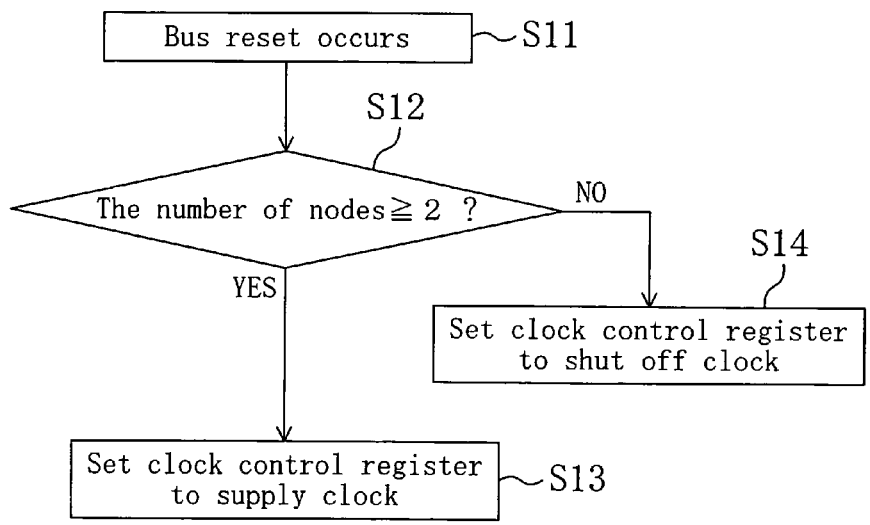
FIG. 4 is a flowchart showing a method for determining whether to supply or shut off a clock.

Hereinafter, an example of determination whether to supply or shut off a clock by the microcomputer 20 will be described with reference to a flowchart shown in FIG. 4.

First, the microcomputer 20 monitors an occurrence of a bus reset (S11). The bus reset occurs when a bus is initialized, e.g., new equipment is connected or disconnected on a 1394 bus. When a bus reset occurs, the value of a node counter 121 in a LINK control section 12 changes. The microcomputer 20 refers to the value of the node counter 121 and detects the occurrence of the bus reset with the change of this value. Upon detecting the occurrence of the bus reset, the microcomputer 20 refers to the current value of the node counter 121, i.e., the number of nodes (S12). If the number of nodes is two or more at this time, the microcomputer 20 recognizes that another equipment is connected on the 1394 bus, and sets the clock control register 16 to supply a clock (S13). On the other hand, if the number of nodes is 1 or less, the microcomputer 20 does not recognize the connection of another equipment on the 1394 bus, and sets the clock control register 16 to shut off a clock (S14). In this manner, it is possible to determine whether to supply or shut off a clock based on the number of nodes.

The determination method based on the number of nodes cannot distinguish whether or not each of the protocol circuits 13a through 13d is actually used. However, this method is easily realized as a method for determining whether to supply or shut off a clock. This method is also applicable to a 1394LSI having either one of AV- and PC-oriented protocol circuits.

It is also possible to use a method for analyzing a packet transmitted on the 1394 bus and determining whether to supply or shut off a clock based on a result of the analysis. The IEEE 1394 standard-compliant packet includes a command particular to a protocol. By referring this command, it is possible to specify which protocol circuit is used.

Now, the timing of determination whether to supply or shut off a clock, i.e., the timing of updating the clock control register 16 will be described.

Figure 5:
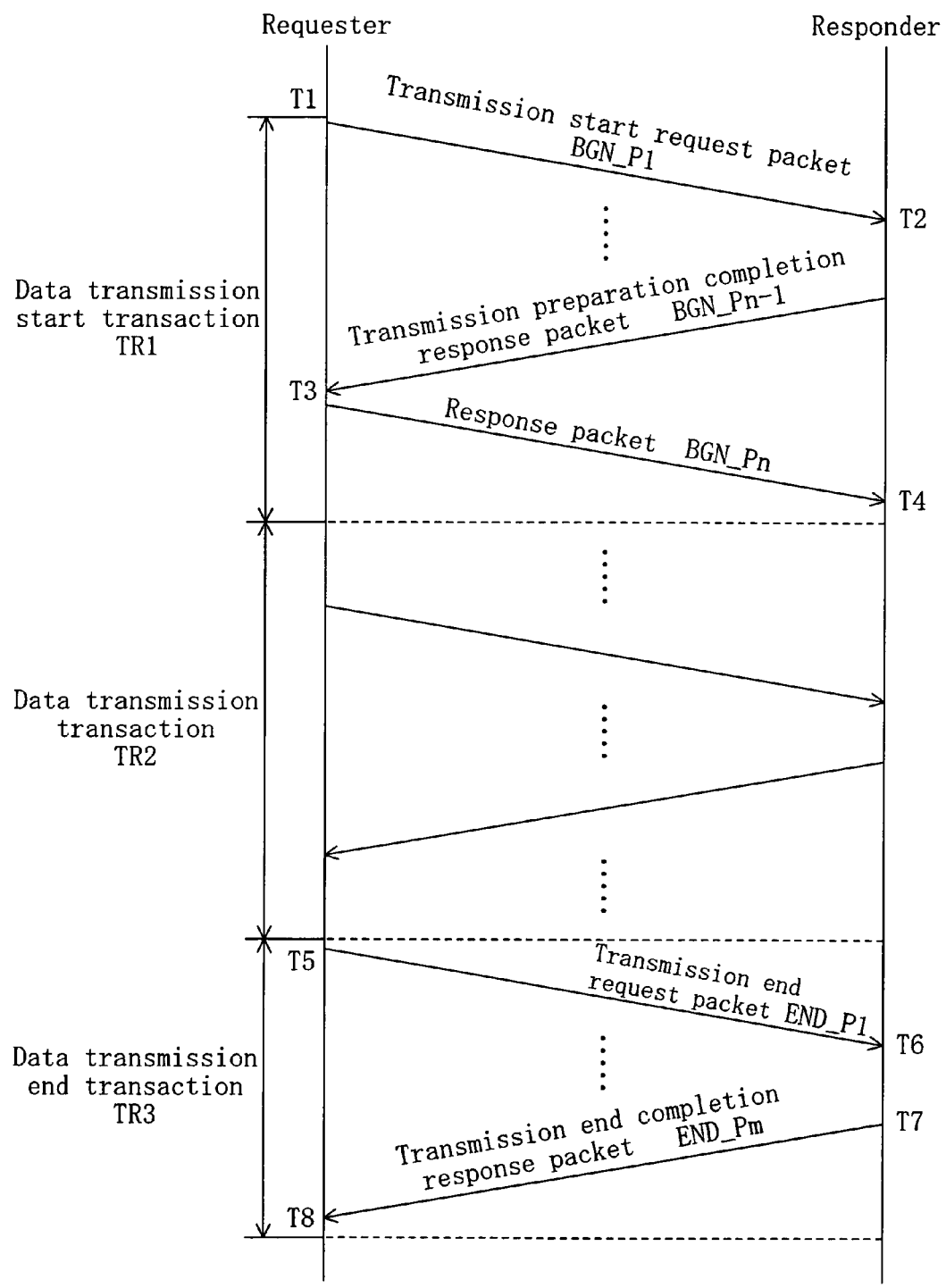
FIG. 5 is a timing chart of IEEE 1394-compliant transactions.

FIG. 5 is a timing chart of an IEEE 1394 standard transaction performed between a requester and a responder. The IEEE 1394 standard transaction is broadly divided into three as shown in the timing chart. A first transaction is a transaction TR1 in which data transmission is requested to begin. A second transaction is a transaction TR2 which is the main part of the data transmission. A third transaction is a transaction TR3 in which the data transmission is requested to end.

First, the timing of making a determination to supply a clock will be described.

In the transaction TR1, a transmission start request packet BGN_P1 as the first packet is transmitted from the requester to the responder. At the requester, a protocol circuit engaged in data transmission is expected to be used from when the request packet BGN_P1 is sent (time T1). Accordingly, a clock to this protocol circuit is shut off until time T1 at the requester, and it is sufficient to update the clock control register 16 such that the clock is supplied after time T1 at the earliest. On the other hand, at the responder, a protocol circuit engaged in the data transmission is expected to be used from when the request packet BGN_P1 is received (time T2). Accordingly, at the responder, it is sufficient to update the clock control register 16 after time T2 at the earliest.

In the transaction TR1, other various packets are transmitted subsequent to the request packet BGN_P1. After the last packet (a response packet BGN_Pn in the example in FIG. 5) has been transmitted, the data transmission transaction TR2 starts. If a clock is supplied to a protocol circuit immediately before the start of the data transmission at each of the requester and the responder, power consumption can be further reduced. Therefore, at the requester, the clock control register 16 is preferably updated after the response packet BGN_Pn has been sent (time T3). Likewise, at the responder, the clock control register 16 is preferably updated after the response packet BGN_Pn has been received (time T4).

Next, the timing of making a determination to shut off a clock will be described.

In the transaction TR3, a transmission end request packet END_P1 as a first packet is transmitted from the requester to the responder. Subsequently, other various packets are transmitted and the transaction TR3 ends when a transmission end completion response packet END_Pm as the last packet is transmitted. At the requester, when the response packet END_Pm is received (time T8), the data transmission has been already completed. Therefore, it is unnecessary to supply a clock to a protocol circuit engaged in the data transmission after time T8 at the requester. It is sufficient to update the clock control register 16 such that a clock to this protocol circuit is shut off before time T8 at the latest. On the other hand, at the responder, when the response packet END_Pm is sent (time T7), the data transmission has been already completed. Therefore, at the responder, it is sufficient to update the clock control register 16 before time T7 at the latest.

If a clock to a protocol circuit is shut off immediately after the end of the data transmission at each of the requester and the responder, power consumption can be further reduced. Therefore, at the requester, the clock control register 16 is preferably updated before the transmission end response packet END_P1 as the first packet in the transaction TR3 is sent (time T5). Likewise, at the responder, the clock control register 16 is preferably updated before the request packet END_P1 is received (time T6).

Hereinafter, the method for making a determination whether to supply or shut off a clock will be specifically described taking an AV protocol as an example. Before describing the method, a general description regarding the AV protocol will be given.

Figure 6:
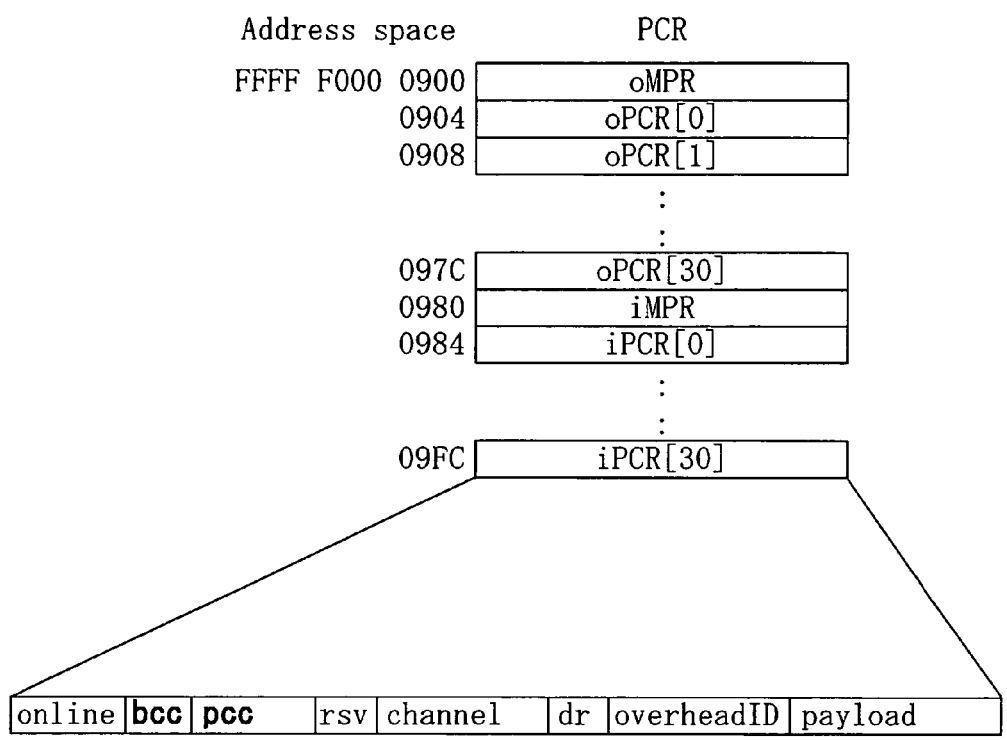
FIG. 6 is an address map of a plug control register (PCR).

Prior to a transmission of an isochronous packet using an AV protocol, a sender needs to acquire a band and a channel number necessary for the transmission from an isochronous resource manager (IRM) so as to establish a connection to a receiver. In this case, the sender refers to a plug control register (PCR). FIG. 6 shows an address map of the PCR and the content thereof.

The connection is divided into two types: a broadcast type and a point-to-point type. In establishing or breaking the connection, the PCR is rewritten through a lock transaction for performing a conditional write operation. First, in establishing a connection, it is determined whether or not a requested connection has been already established in the lock transaction. Then, if a connection has not been established yet, necessary information is written into the PCR to establish a connection. On the other hand, if a connection has been already established, no information is written into the PCR.

When broadcast connections are established, a broadcast connection counter (bcc) register showing the number of broadcast connections in the PCR is set at "1". On the other hand, when point-to-point connections are established, a point-to-point connection counter (pcc) register showing the number of point-to-point connections in the PCR is set at the number of the point-to-point connections which are currently established.

Now, an update of the register R1 (information on supply/shut-off of a clock to the ISO control section 13a) in the clock control register 16 in a case where data transmission is performed with an AV protocol will be described.

Transmission of an isochronous packet includes a case where a first device (first node) establishes a connection spontaneously to initiate a transmission of an isochronous packet and a case where another device (second node) changes an oPCR of the first node to establish a connection forcefully to perform a transmission of the isochronous packet.

Figure 7:
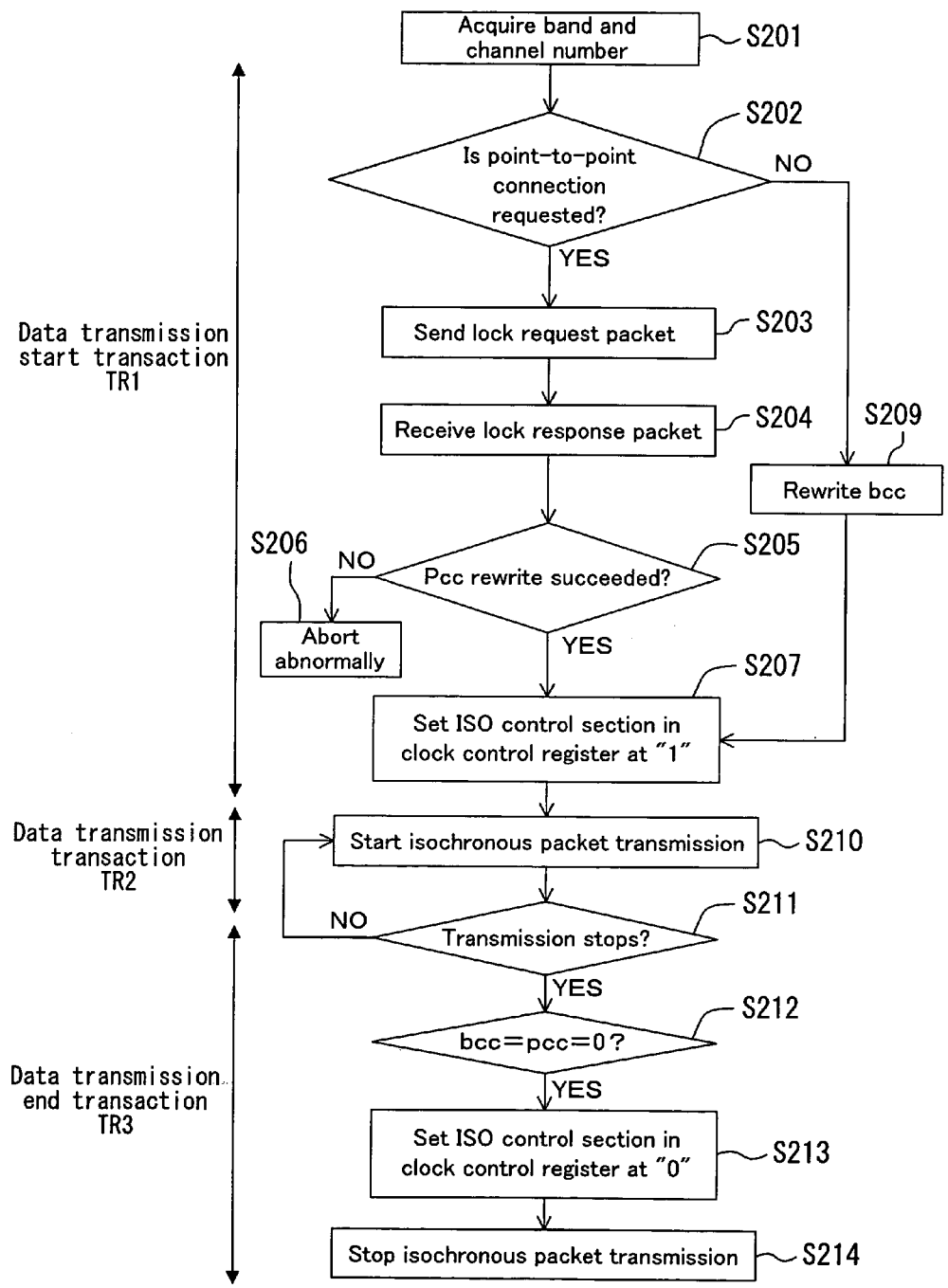
FIG. 7 is a flowchart in a case where a first node establishes/breaks a connection.

FIG. 7 is a flowchart in the case where the first node establishes/breaks a connection. First, a band and a channel number necessary for the transmission of the isochronous packet are acquired from the IRM (S201). Then, if a point-to-point connection is requested (S202), a lock transaction is initiated, so that a lock request packet is transmitted to the second node (S203). When the PCR is rewritten in the second node, a lock response packet is transmitted. Then, when the lock response packet is received (S204), it is determined whether or not the pcc register was updated correctly (S205). If the update fails, the process aborts abnormally (S206). If the update succeeds, a point-to-point connection is established. In this case, the register R1 in the clock control register 16 is set at "1" (S207).

On the other hand, if a broadcast connection is requested, a band and a channel number are acquired, and then the bcc register in the PCR of the first node is rewritten (S209). In this manner, a broadcast connection is established. In this case, the register R1 in the clock control register 16 is set at "1" (S207) in the same manner as described above.

By setting the register R1 in the clock control register 16 at "1", a clock is supplied to the ISO control section 13a, thus allowing processing on the AV protocol. Thereafter, a transmission of an isochronous packet is initiated (S210). As described above, in this specific example, the clock control register 16 is updated immediately before the data transmission.

In the case of an instruction of stopping the transmission (S211), the values of the bcc register and the pcc register are referred to (S212). In the case of stopping the transmission of the isochronous packet, the bcc or pcc register used by the first node are decremented. If these registers are both "0" after this decrementing, all the connections are broken. At this time, a clock to the ISO control section 13a can be shut off, and the register R1 in the clock control register 16 is set at "0" (S213). Thereafter, a transmission of the isochronous packet ends (S214). In this manner, in this specific example, the clock control register 16 is updated immediately after the data transmission.

Figure 8:
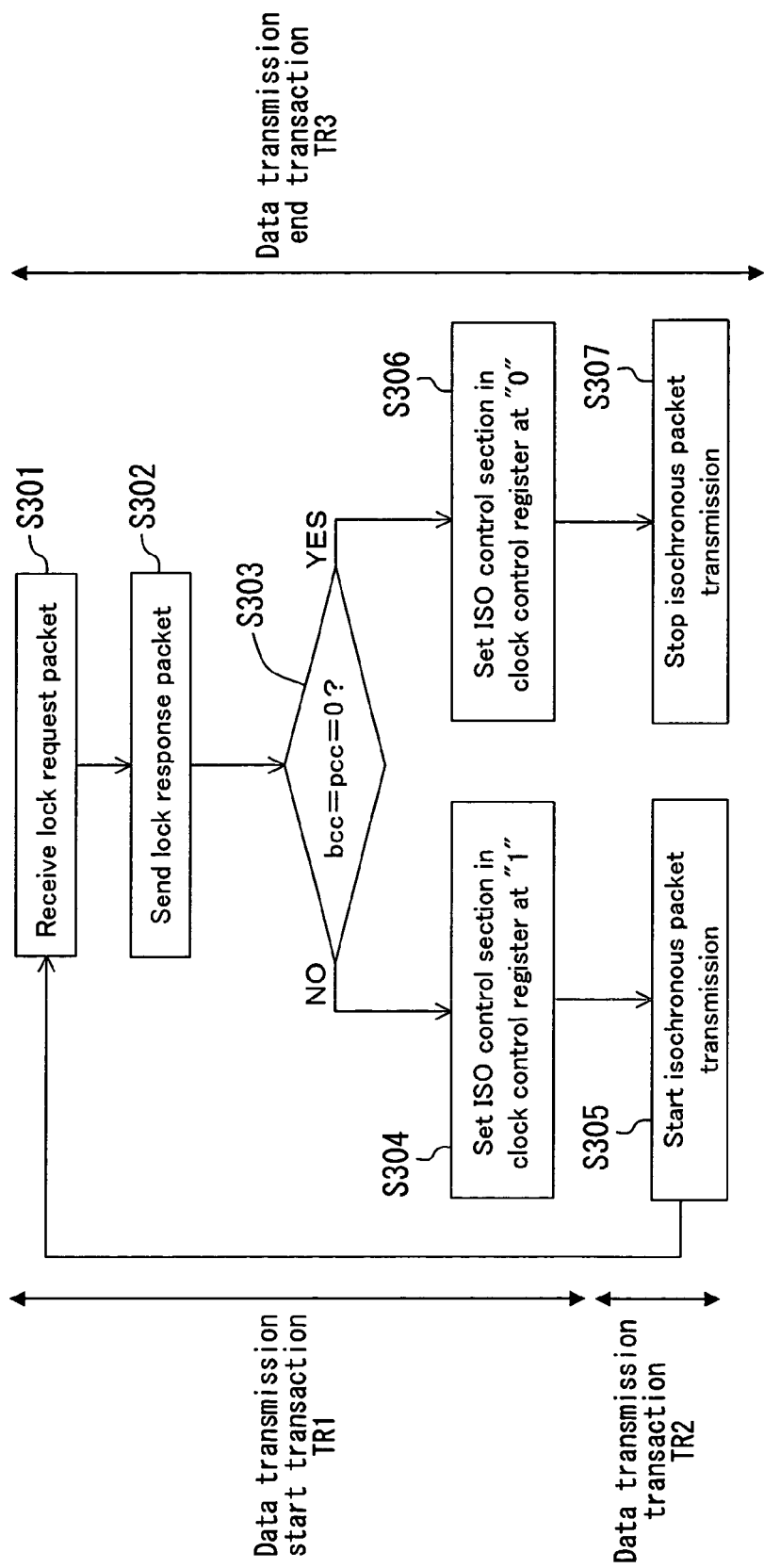
FIG. 8 is a flowchart in a case where a second node establishes/breaks a connection.

In the case where the second node changes the oPCR register of the first node to establish a connection forcefully, the following processing is carried out. FIG. 8 is a flowchart in a case where the second node establishes/breaks a connection. First, upon reception of a lock request packet from the second node, the PCR is updated (S301). After the update of the PCR, a lock response packet is transmitted (S302). Then, it is confirmed whether or not the bcc register and the pcc register in the oPCR register of the first node are both "0" (S303). If one of the registers is not "0", a request for establishing a connection from the second node has occurred, so that the register R1 in the clock control register 16 is set at "1" in preparation for the transmission of the isochronous packet (S304). Accordingly, a clock is supplied to the ISO control section 13a, thus allowing the processing on the AV protocol. In this manner, in this specified example, the clock control register 16 is updated immediately before the data transmission.

If the lock request packet is received from the second node during the transmission of the isochronous packet and an update event of the PCR occurs (S301), it is confirmed whether or not the bcc register and the pcc register in the oPCR register of the first node are both set at "0" (S303). If these registers are both at "0", all the connections are broken. At this time, a clock to the ISO control section 13a can be shut off, and the register R1 in the clock control register 16 is set at "0" (S306). Thereafter, the transmission of the isochronous packet stops (S307). In this manner, in this specified example, the clock control register 16 is updated immediately after the data transmission.

As described above, in this embodiment, the 1394ISI 10A is provided with the clock control register 16, so that the number of terminals can be reduced as compared to the first embodiment. This also makes the switches 14a through 14d less susceptible to noise from the outside. In addition, the microcomputer 20 determines whether or not each of the protocol circuits 13a through 13d is used based on the 1394-control-information. Accordingly, the power consumption of the 1394LSI 10A can be reduced to a minimum. If the clock control register 16 is updated at an optimum timing as described above, the power consumption of the 1394LSI 10A can be reduced to about 55%.

In the above embodiment, the microcomputer 20 is provided outside the 1394LSI 10A. Alternatively, a function of the microcomputer 20, i.e., the determination means, may be incorporated in the 1394LSI 10A. In such a case, processing which should be carried out by the microcomputer 20 provided outside is reduced, so that the microcomputer 20 can be replaced with one having lower performance, i.e., cheaper one.

A clock may be supplied when the register value is "0" and shut off when the register value is "1". In such a case, the same effects of the present invention are also obtained.

In addition, in the above embodiments, each of the 1394LSIs 10 and 10A is provided with four protocol circuits. However, the present invention is not limited to these embodiments. 1394LSIs with five or more protocol circuits can achieve the same effects as those obtained in the above embodiments.

Moreover, in the above embodiments, the protocol circuits 13a through 13d are switched between operation and non-operation by switching the clock between supply and shut-off However, the present invention is not limited to this. For example, power supplies for the protocol circuits 13a through 13b may belong to respective systems so that supply/shut-off operations for these power sources are carried out.

As described above, according to the present invention, in an interface control semiconductor integrated circuit including a plurality of protocol circuits engaged in an IEEE 1394 standard-compliant serial data transmission, a clock can be supplied or shut off individually with respect to each of the protocol circuits. Accordingly, it is possible to supply a clock only to a protocol circuit which should be used for data transmission, while shutting off clocks to unused protocol circuits. As a result, power consumption of the interface control semiconductor integrated circuit can be reduced.

In addition, a determination whether to supply or shut off a clock is performed based on 1394-control-information, so that a clock is appropriately supplied or shut off to a protocol circuit. This reduces the power consumption of the interface control semiconductor integrated circuit to a minimum. Accordingly, if the inventive interface control semiconductor integrated circuit is used to mobile equipment that is keenly required to reduce power consumption in particular, operation time of the mobile equipment increases advantageously.

In the foregoing description of the present invention, the IEEE 1394 interface is taken as an example. However, the present invention is not limited to this. That is to say, the present invention is applicable to data transmission systems for serial data transmissions based on standards similar to IEEE 1394 standard (e.g., USB standard). In such a case, the same advantages are achieved.

What is claimed is:

1. A data transmission system for carrying out a serial data transmission based on IEEE 1394 standard, the system comprising:
   an interface control semiconductor integrated circuit for controlling the serial data transmission, the interface control semiconductor integrated circuit including a plurality of protocol circuits and a plurality of switches associated with the respective protocol circuits, each of the switches performing a switching between supply and shut-off of a clock; and
   determination means for obtaining 1394-control-information, which includes a type of data to be transmitted, from the interface control semiconductor integrated circuit and making a determination whether to supply or shut off the clock with respect to each of the protocol circuits based on the type of data to be transmitted, which is included in the 1394-control-information,
   wherein each of the switches performs the switching based on the determination of the determination means.
2. The data transmission system of claim 1, wherein the interface control semiconductor integrated circuit includes:

a clock control register for holding control information on the switches; and a clock selector for controlling operation of the switches based on the control information, and the determination means updates the control information held in the clock control register, based on the determination.

3. The data transmission system of claim 1, wherein the 1394-control-information is a number of nodes on an IEEE 1394 bus, and the determination means makes the determination based on the number of nodes.

4. The data transmission system of claim 1, wherein the 1394-control-information is a packet transmitted on an IEEE 1394 bus, and the determination means analyzes the packet and makes the determination based on a result of the analysis.

5. The data transmission system of claim 1, wherein the determination means makes the determination to supply the clock to one of the protocol circuits engaged in the data transmission, after a first packet has been sent or received in a transaction in which the data transmission is requested to begin, at the earliest.

6. The data transmission system of claim 5, wherein the determination means makes the determination to supply the clock, after a last packet has been sent or received in the transaction.

7. The data transmitting system of claim 1, wherein the determination means makes the determination to shut off the clock with respect to one of the protocol circuits engaged in the data transmission, before a last packet is sent or received in a transaction in which the data transmission is requested to end, at the latest.

8. The data transmitting system of claim 7, wherein the determination means makes the determination to shut off the clock, before a first packet is sent or received in the transaction.

9. A protocol circuit controlling method for controlling protocol circuits in an interface control semiconductor integrated circuit for controlling a serial data transmission based on IEEE 1394 standard, the method comprising:

a determination step of making a determination whether to operate each of the protocol circuits or not, based on a type of data to be transmitted, which is included in 1394-control-information obtained from the interface control semiconductor integrated circuit; and a control step of controlling a switching between operation and non-operation of each of the protocol circuits based on the determination in the determination step.

10. The method of claim 9, wherein the 1394-control-information is a number of nodes on an IEEE 1394 bus, and in the determination step, the determination is made based on the number of nodes.

11. The method of claim 9, wherein the 1394-control-information is a packet transmitted on an IEEE 1394 bus, and in the determination step, the packet is analyzed so that the determination is made based on a result of the analysis.

12. The method of claim 9, wherein in the determination step, the determination to operate each of the protocol circuits is made, after a first packet has been sent or received in a transaction in which the data transmission is requested to begin, at the earliest.

13. The method of claim 12, wherein in the determination step, the determination to operate each of the protocol circuits is made, after a last packet has been sent or received in the transaction.

14. The method of claim 9, wherein in the determination step, the determination not to operate each of the protocol circuits is made, before a last packet is sent or received in a transaction in which the data transmission is requested to end, at the latest.

15. The method of claim 14, wherein in the determination step, the determination not to operate each of the protocol circuits is made, before a first packet is sent or received in the transaction.

16. A data transmission system for carrying out a serial data transmission, the system comprising:

an interface control semiconductor integrated circuit for controlling the serial data transmission, the interface control semiconductor integrated circuit including a plurality of protocol circuits and a plurality of switches associated with the respective protocol circuits, each of the switches performing a switching between supply and shut-off of a clock; and determination means for obtaining a packet transmitted by the interface control semiconductor integrated circuit and analyzing the packet, which includes a type of data to be transmitted, to make a determination whether to supply or shut off of the clock with respect to each of the protocol circuits based on the type of data to be transmitted which is included in the packet, wherein each of the switches performs the switching based on the determination of the determination means.

17. A protocol circuit controlling method for controlling protocol circuits in an interface control semiconductor integrated circuit for controlling a serial data transmission, the method comprising:

an obtaining step of obtaining a packet transmitted by the interface control semiconductor integrated circuit;

an analyzing step of analyzing the packet, which includes a type of data to be transmitted;

a determination step of making a determination whether to operate each of the protocol circuits or not, based on the type of data to be transmitted, which is included in the packet; and a control step of controlling a switching between operation and non-operation of each of the protocol circuits based on the determination in the determination step.

* * * * *